United States Patent Office 3,067,256
Patented Dec. 4, 1962

3,067,256
PROCESS FOR PREPARING ALDEHYDES BY ISOMERIZATION OF ALPHA-OLEFIN OXIDES
Kurt Fischer, Neuotting, and Klaus Vester, Burgkirchen, Germany, assignors to Farbwerke Hoechst Aktiengesellschaft vormals Meister Lucius & Brüning, Frankfurt am Main, Germany, a corporation of Germany
No Drawing. Filed June 22, 1959, Ser. No. 821,670
5 Claims. (Cl. 260—601)

This invention relates to a process for preparing aldehydes by isomerization of alpha-olefin oxides and is a continuation-in-part of our copending patent application Serial No. 632,002 filed January 2, 1957, and now abandoned.

It is known that alpha-olefin oxides, such as ethylene oxide, propylene oxide and 1.2-butylene oxide can be converted in the gaseous phase in the presence of catalysts and at a raised temperature into the corresponding isomeric aldehydes. As catalysts it has proved advantageous to use substances such as aluminum oxide, silica gel, kieselguhr, aluminum borate, alums, lithium phosphate, magnesium pyrophosphate, or oxides of metals belonging to the sub-groups of the periodic system; furthermore zinc chloride, lead chloride or cadmium chloride. The catalysts are used per se or on a carrier, such as pumice, graphite or silica gel, and are arranged in the reaction chamber, either in a stationary, or in a whirling layer. The reaction is usually performed under atmospheric pressure, but may, if desired, be carried out under a slightly reduced or raised pressure and at a temperature within the range of 150–450° C. The alpha-olefin oxides are passed over the catalysts either alone or in admixture with inert gases, such as nitrogen, carbon dioxide or steam.

The process described above involves, however, various disadvantages. The heat set free by formation of the aldehyde is about 25 cal./mol. when the lower members of the olefin oxides are used. When the olefin oxides are allowed to react in an undiluted form at the catalyst, very high temperatures are produced in the various sections of the reaction chamber, even with the use of a cooling medium to effect an optimal indirect heat absorption. These temperatures cause carbonization of the product obtained by the process and lead to an incrustation and inactivation of the catalysts within a few hours or days.

When the reaction heat is directly dissipated by the addition of inert gases, the life of the catalyst is prolonged, but the separation of the aldehyde from gaseous mixtures containing nitrogen or carbon dioxide is difficult and involves losses.

Now, we have found that in the production of aldehydes by isomerization of alpha-olefin oxides, for example those mentioned above or the higher homologues or styrene oxides, it is very useful to use the corresponding aldehydes themselves as diluent. In carrying out this process, care is taken that only part of the reaction product condenses beyond the reaction furnace, whereas another part remains in the gaseous state and is cycled. In each particular case, fresh olefin oxide is introduced into the cycled gas in an amount such as corresponds to the aldehyde obtained. The fresh oxide may be introduced into the current of the cycling crude aldehyde vapour by means of a nozzle. The proportion by weight of the olefin oxide to the aldehyde in the gas mixture entering the reactor is preferably within the range of 1:4 and 1:20. In this manner, part of the reaction heat is utilized for bringing about a mild evaporation and preheating of the fresh oxide. When the cycled quantity of aldehyde is kept at a smaller rate than corresponds to the amount of heat to be dissipated, it will be possible additionally to introduce water vapour, for example before the olefin oxide enters the reactor, which optionally may also be cycled. The reaction temperature may vary between 150° C. and 450° C. depending on the nature of the processed olefin oxide and on the type of catalyst used; temperatures between 170 and 320° C. have proved especially advantageous. The residence time of the gas mixture in the reaction chamber depends also on the catalyst used and the olefin oxide to be reacted.

As catalysts, there may advantageously be used the above specified weak acid substances such as potassium bisulfate, acid salts of phosphoric acid or molybdenic acid; there may also be used alums and other salts of double salts having an acid reaction, such as potassium-aluminum-sulfate, sodium-iron-sulfate or potassium-magnesium-sulfate.

The reaction may be performed under the most varied conditions and may be carried out with or without application of pressure. An application of pressure is advantageous when it is intended to react a low molecular olefin oxide to obtain the corresponding aldehyde, in which case a partial condensation may advisably be brought about with the use of ordinary cooling water without using additional cooling means.

It should be noted that in the above process the aldehyde vapour is not chemically changed during the cyclization as a result of its stability. The cyclization involves the special advantage that—as a result of the high specific heat which aldehyde vapour has at 200–300° C. as compared with other inert gases, such as nitrogen and carbon dioxide—the aldehyde vapour constitutes an excellent medium to dissipate the reaction heat under mild conditions and furthermore to protect fresh olefin oxide against side reaction during the process. The reaction proceeds, with respect to the oxide used, under a low partial pressure, so to speak in vacuo, and hence under especially mild conditions. Accordingly, in the above process substantially no by-products are formed so that the catalyst remains active for a prolonged time. Another advantage offered by this invention resides in the fact that the process is normally carried out without supply of heat from the outside, whereas a large amount of heat must be supplied when inert gases are used, since these gases must first be preheated to the reaction temperature. The aldehyde used in this invention as diluent is generally already at the reaction temperature.

The following examples serve to illustrate the invention, but they are not intended to limit it thereto, the parts being by weight:

*Example 1*

A mixture of 90 parts of crude propionaldehyde which is conducted as described below in this example in a cycle and contains 89.9 percent (by weight) of propionaldehyde, 0.6 percent (by weight) of propylene-oxide and 9.5 percent (by weight) of higher boiling by-products, and 10 parts of propylene-oxide, preheated to 190° C., is introduced in the state of vapor pressure at a velocity of 15 cm./sec. and under normal pressure into a reaction furnace charged with lumpy aluminum-oxide serving as a catalyst. The gas which is almost free from olefin-oxide leaves the furnace at a temperature of 260° C. 10 parts of this gas are removed from the cycle and fractionated. There are obtained 8.99 parts of propionaldehyde, 0.06 part of unreacted propylene-oxide and 0.95 part of higher boiling by-products, especially allyl-alcohol and methyl-ethyl-acrolein. The reacted quantity is 99.4 percent, and the yield of propionaldehyde amounts to 89.9 percent. In an evaporator pipe 10 parts of propyleneoxide are introduced at room temperature through a nozzle into the cycling gas consisting of 90 parts of crude aldehyde which is heated to 260° C. The resulting temperature of the mixed gases is 210° C. The temperature of admission into the reaction furnace is exactly adjusted to 190° C. by a cooling coil. The mixture of oxide and aldehyde is pumped into the reaction furnace by a vane-type pump which is insulated to prevent loss of heat. For the starting of the device the cooling coil is used as heating coil by charging it with steam under a pressure of 20 atmospheres (gauge).

*Example 2*

86 parts of crude acetaldehyde composed as indicated below and 14 parts of ethylene-oxide are introduced at a temperature of 175° C. and under a pressure of 3.5 atmospheres (gauge) into a reactor charged with silica gel having a grain size of 4–6 mm. at a space velocity of 1030 grams per litre, per catalyst per hour. 14 parts of the crude acetaldehyde leaving the reactor at 315° C. are condensed and fractionated under the same pressure of 3.5 atmospheres (gauge). The condensate contains 91.3 parts of acetaldehyde, 0.2 part of ethylene-oxide, 6.5 parts of higher boiling by-products and 2.0 parts of water. This content corresponds to a reacted quantity of 99.8 percent and to a yield of acetaldehyde of 93.2 percent. The crude aldehyde which is not liquefied (86 parts) is mixed with 14 parts of ethylene-oxide cooled to the temperature of admission of 175° C. and reintroduced into the reactor.

We claim:

1. A process for the manufacture of an aldehyde which comprises contacting an oxide selected from the group consisting of aliphatic unsubstituted alpha-olefinic oxides and styrene oxide at a temperature of 150–450° C. together with a part of recycled aldehyde reaction product, the ratio of the aldehyde to said oxide being 20:1 to 4:1, and with a solid catalyst selected from the group consisting of aluminum oxide, silica gel, kieselguhr, aluminum borate, lithium phosphate, magnesium pyrophosphate, zinc chloride, lead chloride, cadmium chloride, potassium bisulfate, acid salts of phosphoric acid, acid salts of molybdenic acid, potassium aluminum sulfate, sodium-iron sulfate and potassium-magnesium sulfate, said oxide being isomerized to form the corresponding aldehyde.

2. The process of claim 1 wherein the reaction temperature is in the range from 170°–320° C.

3. The process of claim 1 wherein the reaction is carried out in the presence of water vapor.

4. The process of claim 1 wherein the α-olefinic oxide is ethylene oxide.

5. The process of claim 1 wherein the α-olefinic oxide is propylene oxide.

References Cited in the file of this patent

UNITED STATES PATENTS

| | | |
|---|---|---|
| 1,906,833 | Baur | May 2, 1933 |
| 2,159,507 | Law et al. | May 23, 1939 |
| 2,521,170 | Jacobs et al. | Sept. 5, 1950 |
| 2,601,538 | Lundsted | June 24, 1952 |
| 2,628,255 | Sexton et al. | Feb. 10, 1953 |
| 2,660,609 | Robeson et al. | Nov. 24, 1953 |
| 2,908,715 | Eguchi | Oct. 13, 1959 |